(12) United States Patent
Urban

(10) Patent No.: US 9,233,866 B2
(45) Date of Patent: Jan. 12, 2016

(54) SLUDGE CONCENTRATOR ASSEMBLY INCORPORATING UPPER CENTRIFUGAL SEPARATOR AND LOWER BARRIER FILTER AND EXHIBITING HIGH FLOW VELOCITY CLEAN FLUID OUTLET COMBINED WITH LOW FLOW VELOCITY SOLID ENTRAPMENT

(71) Applicant: JK Industries, LLC, Warren, MI (US)

(72) Inventor: Keith Urban, Waterford, MI (US)

(73) Assignee: JK Industries, LLC, Troy, MI (US)

( * ) Notice: Subject to any disclaimer, the term of this patent is extended or adjusted under 35 U.S.C. 154(b) by 444 days.

(21) Appl. No.: 13/742,990

(22) Filed: Jan. 16, 2013

(65) Prior Publication Data

US 2013/0180907 A1 Jul. 18, 2013

Related U.S. Application Data

(60) Provisional application No. 61/586,957, filed on Jan. 16, 2012.

(51) Int. Cl.
*B01D 36/00* (2006.01)
*C02F 11/12* (2006.01)
*B01D 36/04* (2006.01)
*C02F 1/38* (2006.01)
*B04C 9/00* (2006.01)
*B04C 5/181* (2006.01)
*B04C 5/103* (2006.01)
*B01D 35/12* (2006.01)
*B01D 35/30* (2006.01)
*C02F 103/16* (2006.01)

(52) U.S. Cl.
CPC ............ *C02F 11/127* (2013.01); *B01D 36/003* (2013.01); *B01D 36/045* (2013.01); *C02F 1/38* (2013.01); *B01D 35/12* (2013.01); *B01D 35/303* (2013.01); *B04C 5/103* (2013.01); *B04C 5/181* (2013.01); *B04C 2009/002* (2013.01); *C02F 2103/16* (2013.01)

(58) Field of Classification Search
None
See application file for complete search history.

(56) References Cited

U.S. PATENT DOCUMENTS

| 1,861,805 | A | * | 6/1932 | Lentz | 210/440 |
| 2,010,435 | A | * | 8/1935 | Matheson | 210/788 |
| 3,685,721 | A | | 8/1972 | Kohama | |

(Continued)

FOREIGN PATENT DOCUMENTS

| GB | 2092483 A | | 8/1982 |
| GB | 2348830 A | * | 10/2000 |
| WO | WO 2010/085331 | * | 7/2010 |

*Primary Examiner* — Thomas M Lithgow
(74) *Attorney, Agent, or Firm* — Dinsmore & Shohl LLP; Douglas J. McEvoy

(57) ABSTRACT

A dual stage filter assembly for use in a fluid cleaning and sludge removal operation. An upper stage centrifugal separator incorporated into a first vessel. A lower stage baffle filter is incorporated into a second vessel, such that a dirty fluid flow delivered to the upper stage separator includes a clean outlet along with a separate dirty outlet which is delivered to an inlet of the lower stage filter for subsequent filtering and outflow. A convex collection element facilitates delivery of dirty fluid to the lower stage filter and includes a cone shaped separator element and can be either fixed or removable relative to the upper stage separator. An ascending pipe from the upper separator evacuates a clean fluid flow resulting from a negative pressure created within the upper separator concurrent with the dirty outlet from the upper stage being directed through the baffle filter in the lower stage.

18 Claims, 12 Drawing Sheets

(56) References Cited

U.S. PATENT DOCUMENTS

| | | | |
|---|---|---|---|
| 4,224,043 A | 9/1980 | Dupre | |
| 4,581,009 A | 4/1986 | Kramer | |
| 4,623,458 A * | 11/1986 | Hakola | 210/238 |
| 4,759,744 A | 7/1988 | Krook | |
| 4,915,681 A | 4/1990 | Suzuki | |
| 4,975,188 A | 12/1990 | Brunsell et al. | |
| 5,267,936 A | 12/1993 | Miachon | |
| 6,090,276 A * | 7/2000 | Ford | 210/167.04 |
| 6,508,752 B1 | 1/2003 | Hallgren et al. | |
| 6,572,524 B1 | 6/2003 | Caldwell | |
| 6,740,235 B2 * | 5/2004 | Gill | 210/238 |
| 6,966,874 B2 | 11/2005 | Cornay et al. | |
| 7,153,255 B2 | 12/2006 | Gillengerten et al. | |
| 7,887,611 B2 | 2/2011 | Asal et al. | |
| 2009/0223875 A1 | 9/2009 | Asal et al. | |
| 2010/0135769 A1 | 6/2010 | Kleynhans et al. | |

* cited by examiner

SLUDGE CONCENTRATOR ASSEMBLY INCORPORATING UPPER CENTRIFUGAL SEPARATOR AND LOWER BARRIER FILTER AND EXHIBITING HIGH FLOW VELOCITY CLEAN FLUID OUTLET COMBINED WITH LOW FLOW VELOCITY SOLID ENTRAPMENT

CROSS REFERENCE TO RELATED APPLICATIONS

The present application claims the priority of U.S. Ser. No. 61/586,957 filed Jan. 16, 2012.

FIELD OF THE INVENTION

The present invention discloses a two stage sludge concentrator assembly incorporating upper centrifugal and lower barrier filter components for providing enhanced sludge separation and removal combined with both high and low flow clean outlets.

BACKGROUND OF THE RELEVANT ART

The prior art discloses examples of centrifugal separator assemblies for separating solid particles from a liquid. Examples of these include the separator constructions disclosed in each of Hallgren U.S. Pat. No. 6,508,752 and Brunsell U.S. Pat. No. 4,975,188 and Kramer U.S. Pat. No. 4,581,009.

Other examples include the decanter centrifuge of Caldwell U.S. Pat. No. 6,572,524 incorporating a heavy phase solids baffle in the form of a radially extending and spiraling disc extending outwardly from a conveyor hub and adapted for projecting into a separated heavy phase material conveyed along a bowl wall.

Suzuki U.S. Pat. No. 4,915,681 discloses a centrifugal separator with continuous discharge incorporating a rotating bowl having a slurry inlet orifice, a sludge discharge port and a liquid discharge port. A screw is positioned concentrically inside the rotating bowl for rotating in the same direction as the bowl at a different speed. At least one baffle plate is provided within the pitch of the screw and is immersed in the liquid separated and accumulated in the rotating bowl in the main section in which the solid/liquid separation is carried out.

SUMMARY OF THE PRESENT INVENTION

The present invention discloses a dual stage filter assembly for use in a fluid cleaning and sludge removal operation. The assembly includes an upper stage centrifugal separator incorporated into a first vessel. A lower stage baffle filter is incorporated into a second vessel, such that a dirty fluid flow delivered to the upper stage separator includes a clean outlet along with a separate dirty outlet which is delivered to an inlet of the lower stage filter for subsequent filtering and outflow.

Additional features include a convex collection element configured at a bottom location of the upper stage separator for facilitating delivery of dirty fluid to the lower stage filter and including at least one of a removable separator plate or cone shaped element. An ascending pipe extends from the upper separator and evacuates a clean fluid flow resulting from a negative pressure created within the upper separator.

Other features include a pair of lower baffle filters selectively communicated to the upper separator via a directional valve integrated into a common fluid collection hub located underneath the convex collection element. The valve configuration is such that it is displaceable between first and second positions in order to selectively direct the downward and dirty outlet flow from the upper centrifugal stage to either of first and second lower positioned pairs of baffle filters. A common mounting post is provided for supporting the pair of lower baffle filter vessels in selective descending and fluidic disengaging and rotatable opening fashion, this in order to facilitate replacement of a polluted baffle filter concurrent with maintaining continued filtering operation through the other baffle filter.

BRIEF DESCRIPTION OF THE DRAWINGS

Reference will now be made to the attached drawings, when read in combination with the following detailed description, wherein like reference numerals refer to like parts throughout the several views, and in which.

Figure 8:
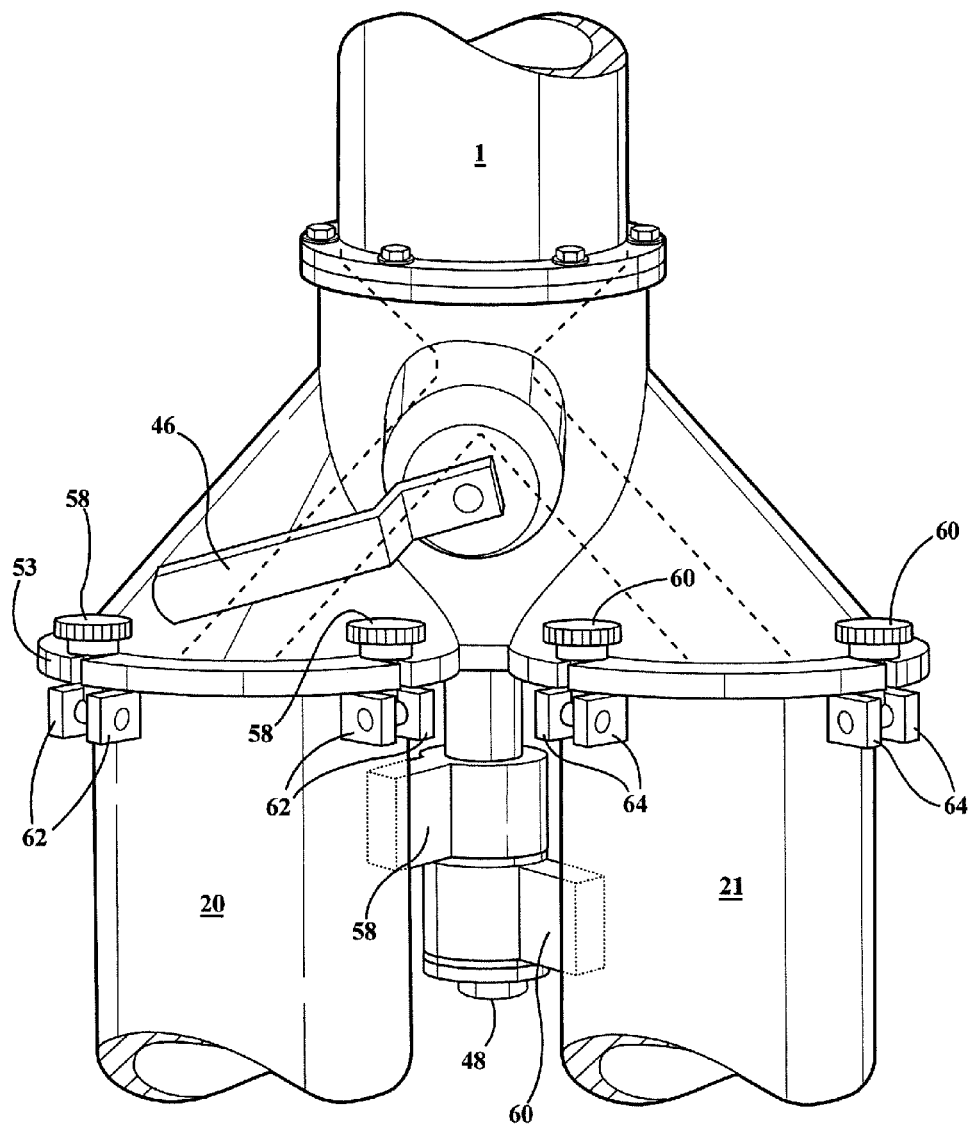
FIG. 8 is a schematic illustration of an alternate variant of a two stage sludge concentrator assembly and which integrates a dual baffle filter arrangement in selective communication with an upper stage centrifugal separator and in which a lever is employed for selectively delivering a waste fluid stream from the upper separator subassembly to a selected/ engaged lower baffle filter subassembly, such permitting the inactive baffle filter subassembly to be rotated outwardly from a first fluidic communicating position to an open position for permitting servicing and/or removal/replacement of a used baffle filter.
Figure 8A:
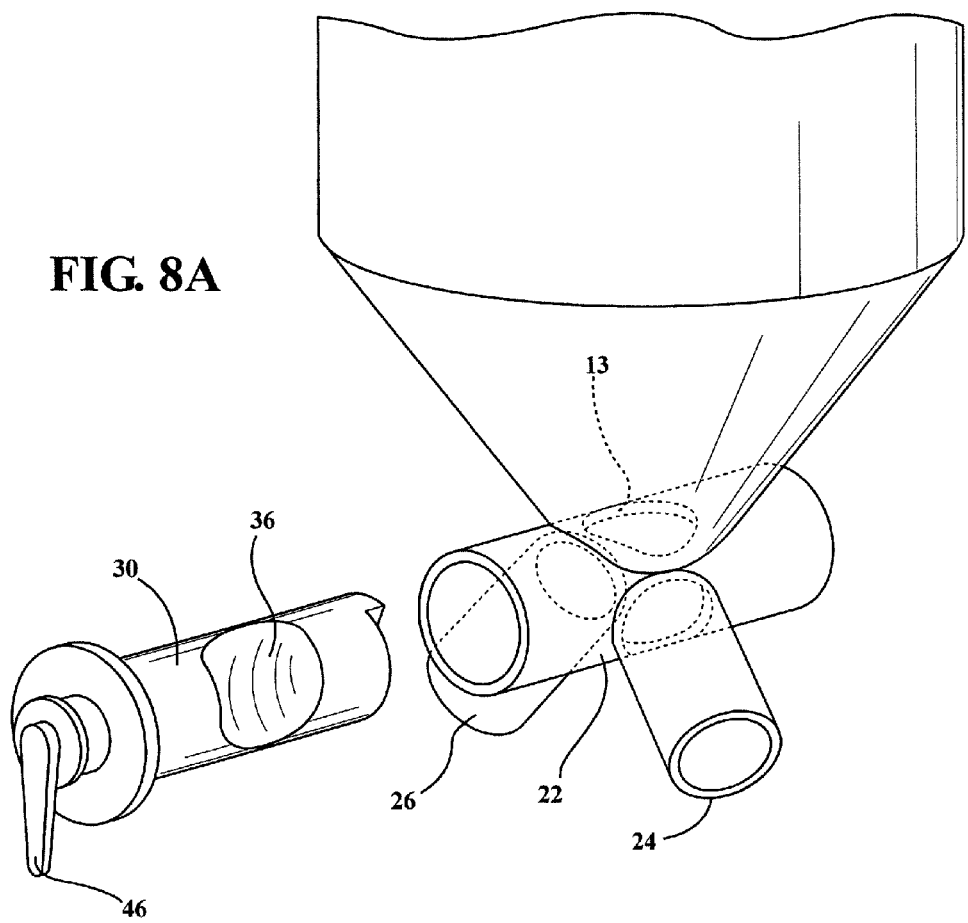
Figure 8B:
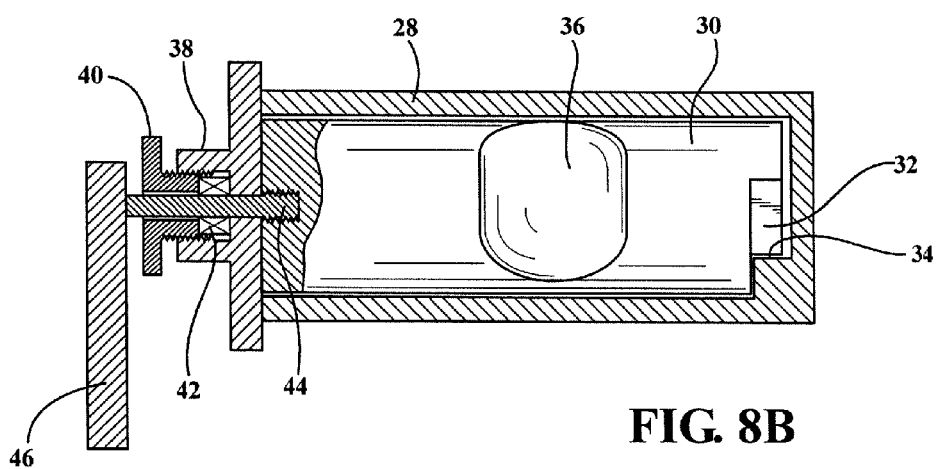

FIG. 8A is an enlarged and partially exploded sectional perspective of a confluence conduit location established below the sludge separating cone and into which is installed a rotatable sleeve supported valve for directing flow between first and second baffle communicating outlet locations;

FIG. 8B is a linear cutaway of the sleeve supported valve in FIG. 8A; and

Figure 9A:
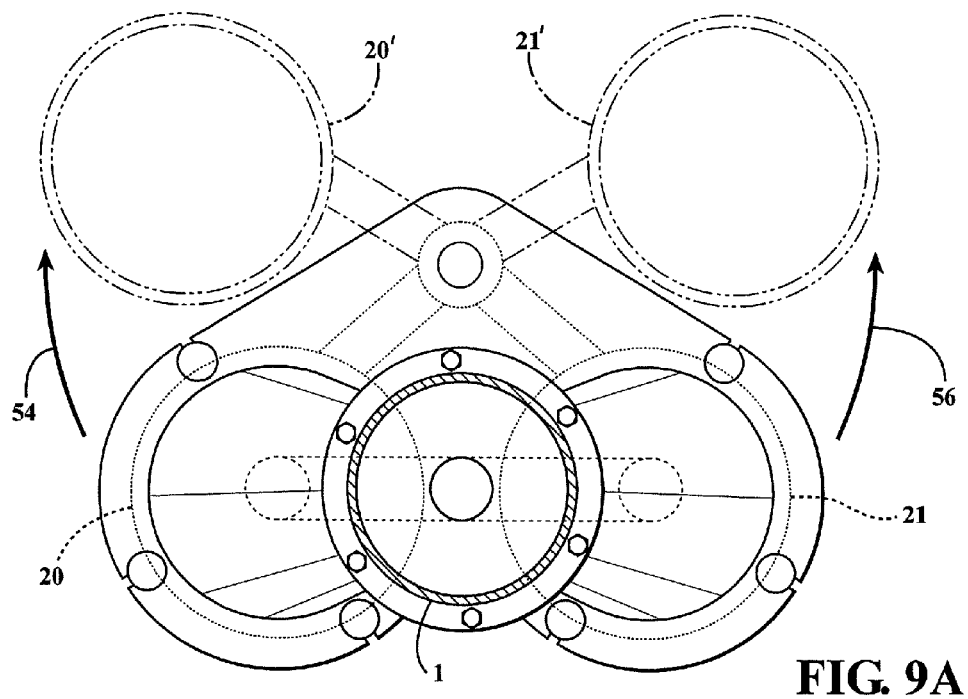
Figure 9B:
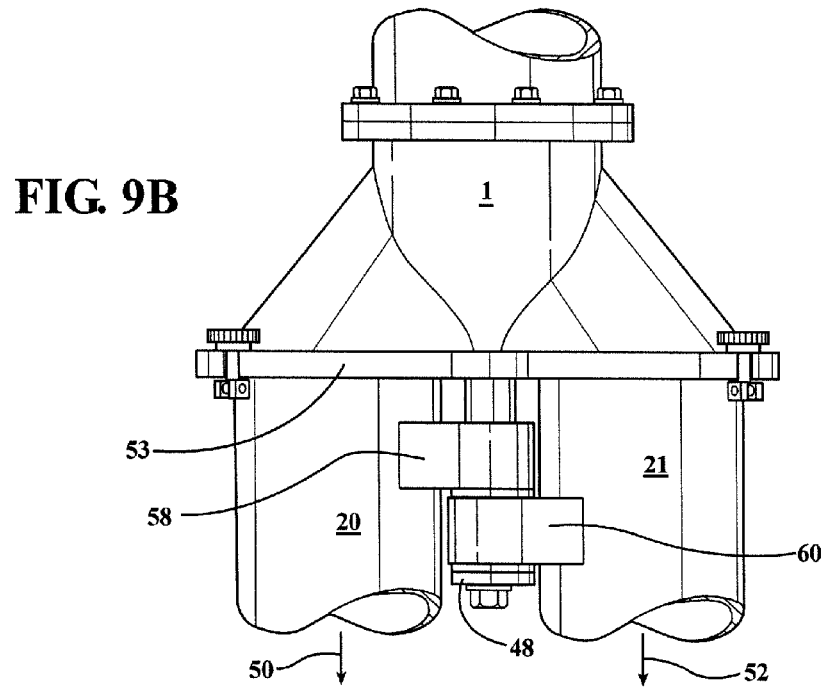

FIGS. 9A and 9B depict top and partial side views of the dual variant of FIG. 8 and which better illustrates one non-limiting drop and rotate configuration for converting either baffle filter subassembly from fluidly connected/engaged to fluidly disconnected/opened positions.

DETAILED DESCRIPTION OF THE PREFERRED EMBODIMENTS

As previously described, the present invention discloses a two stage sludge concentrator assembly incorporating upper centrifugal and lower barrier filter components for providing enhanced sludge separation and removal combined with both high and low flow clean outlets. As will be described in further detail with reference to the succeeding illustrations, the dual stage sludge concentrator assembly can be integrated into any suitable machining or metal working operation, as well as any of a number of non-limiting cleaning or other processing operations associated with the production or conditioning of parts. Regardless of application, the dual stage assembly operates to clean or recondition an outlet fluid by the removal of any or all of oils, metal shavings, dirt, sludge, aggregates or other contaminants.

Figure 1:
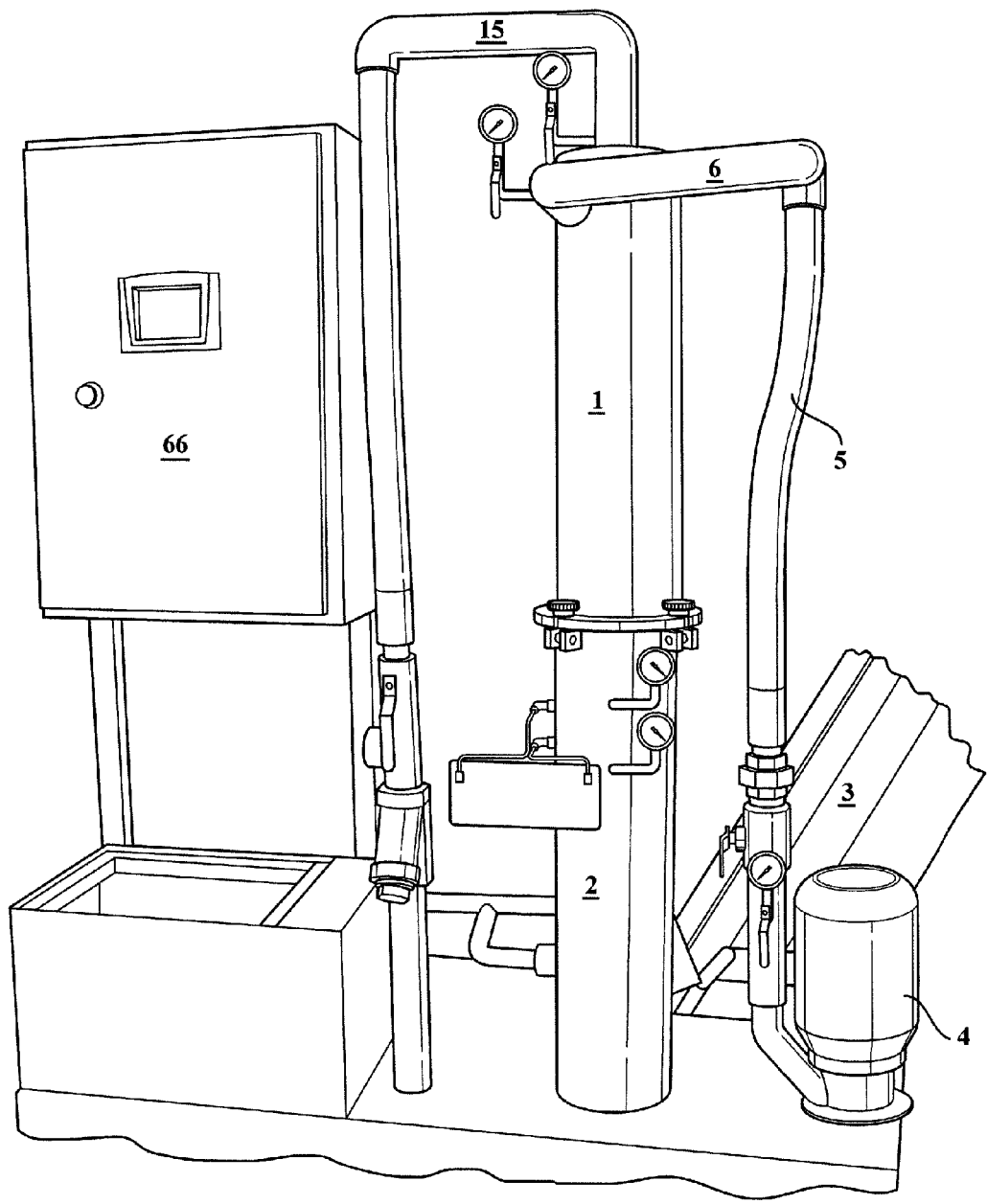
FIG. 1 is an operational view of the two stage sludge concentrator assembly according to the present invention and including first upper centrifugal separator and second lower baffle filter subassemblies.
Figure 2:
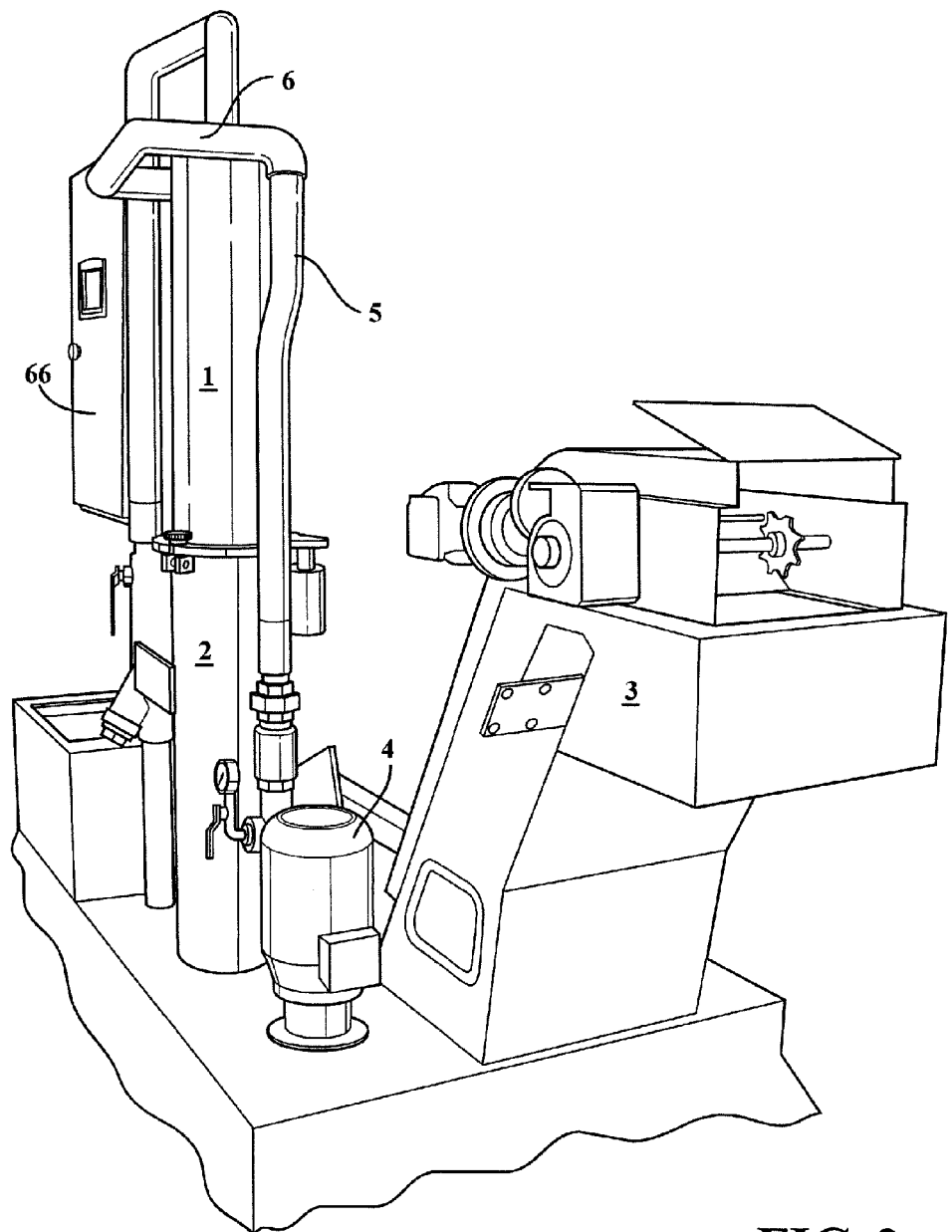
FIG. 2 is a rotated side perspective of the concentrator assembly depicted in FIG. 1 and better showing additional components of an associated machine stage located coolant supply and filtration assembly within which the concentrator assembly is integrated.

Referring initially to FIG. 1, an operational view is shown of the two stage sludge concentrator assembly according to the present invention and which includes first upper centrifugal separator 1 and second lower baffle filter 2 which are provided as a pair of fluidly communicating subassemblies. As previously described, the overall two stage assembly is integrated into a machine stage located coolant supplying or other localized machining operation, this further generally represented by a conveyor portion 3 associated with a part bath or the like.

A pump 4 provides an inlet pressurized flow of (dirty) fluid such as from the localized operation and which is delivery, via an ascending inlet fluid line 5 to an inlet pipe conduit 6 located at an upper end of the first upper centrifugal separator 1. Without limitation, it is understood that the present assembly is capable of being utilized with or integrated into any dirty outlet flow in which separation of a fluidic entrained particulate is desired and which is not limited to the part washing or processing assembly depicted herein for purposes of background illustration.

Figure 4:
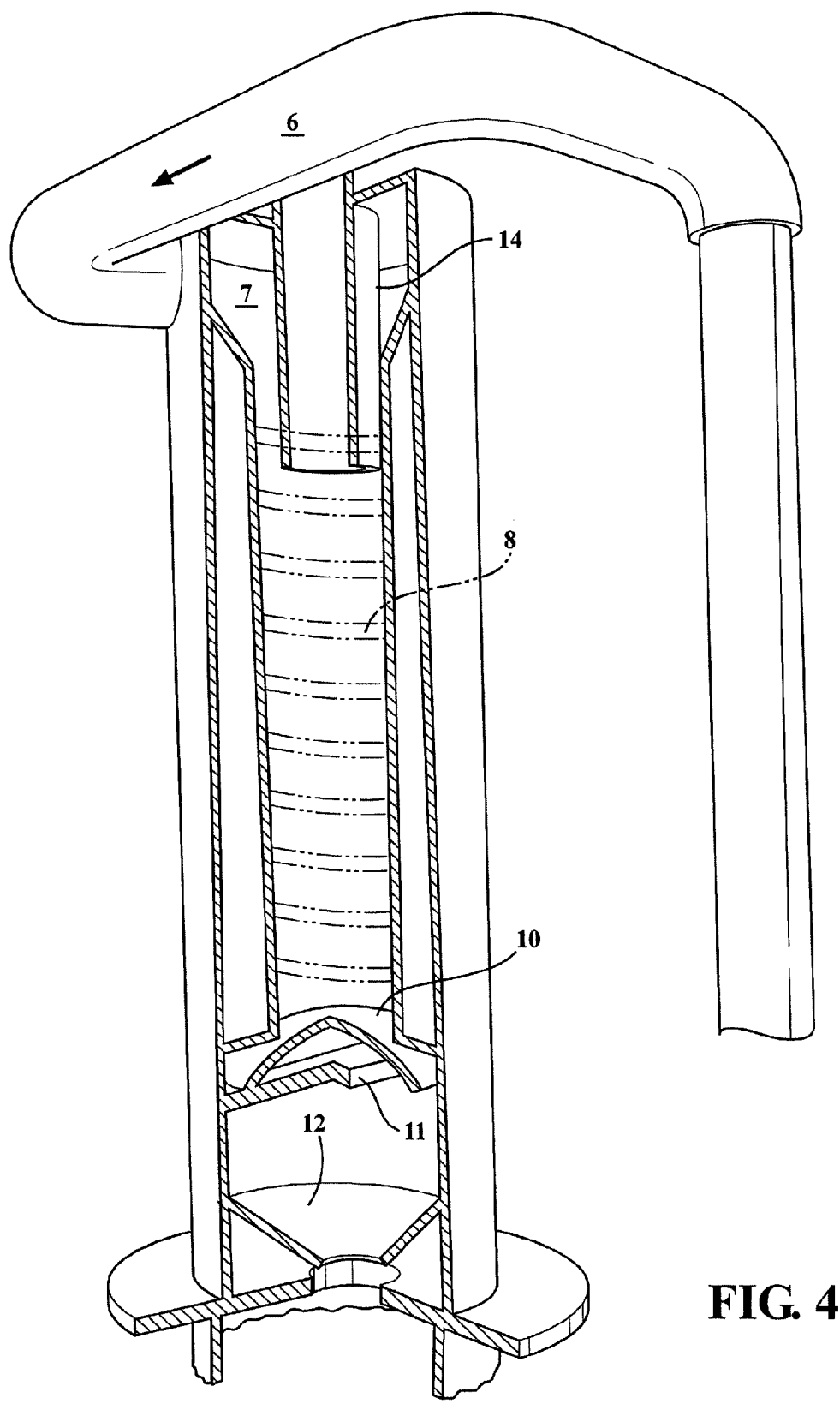
FIG. 4 is an illustration of the upper centrifugal separator subassembly with part of the outer housing removed and better illustrating some of the components associated with its interior constructions, the spiraling centrifugal separator being depicted in phantom.
Figure 5:
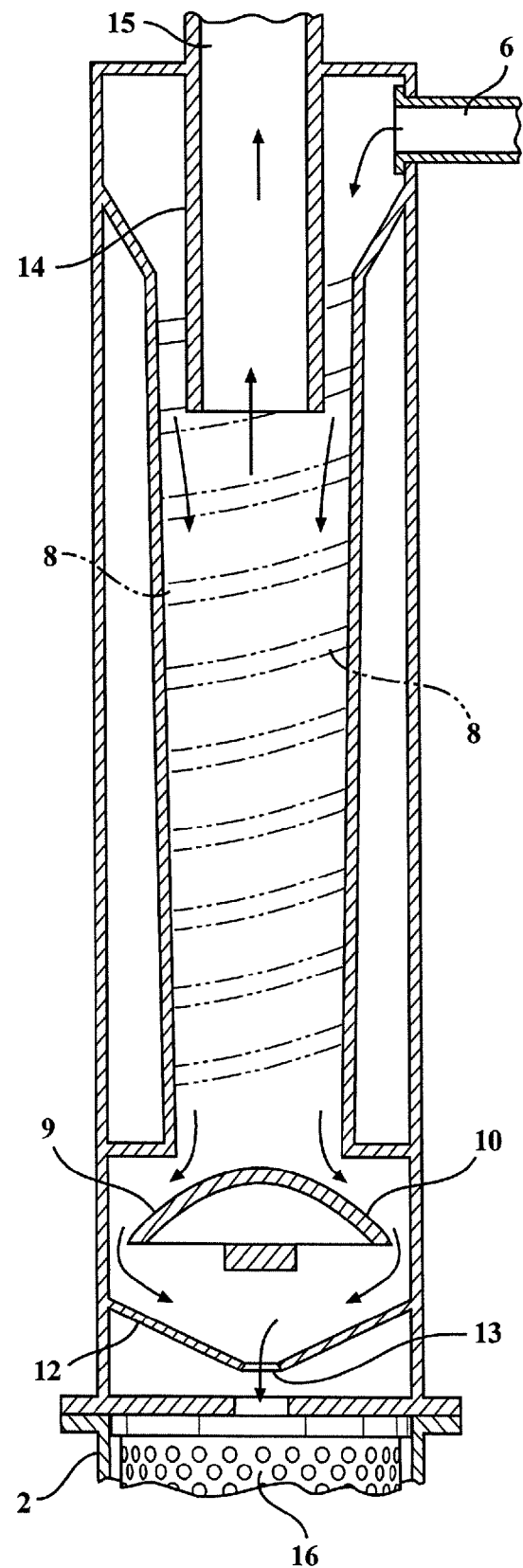
FIG. 5 expands on the illustration of FIG. 4 and depicts a plan schematic of the upper centrifugal separator.
Figure 6:
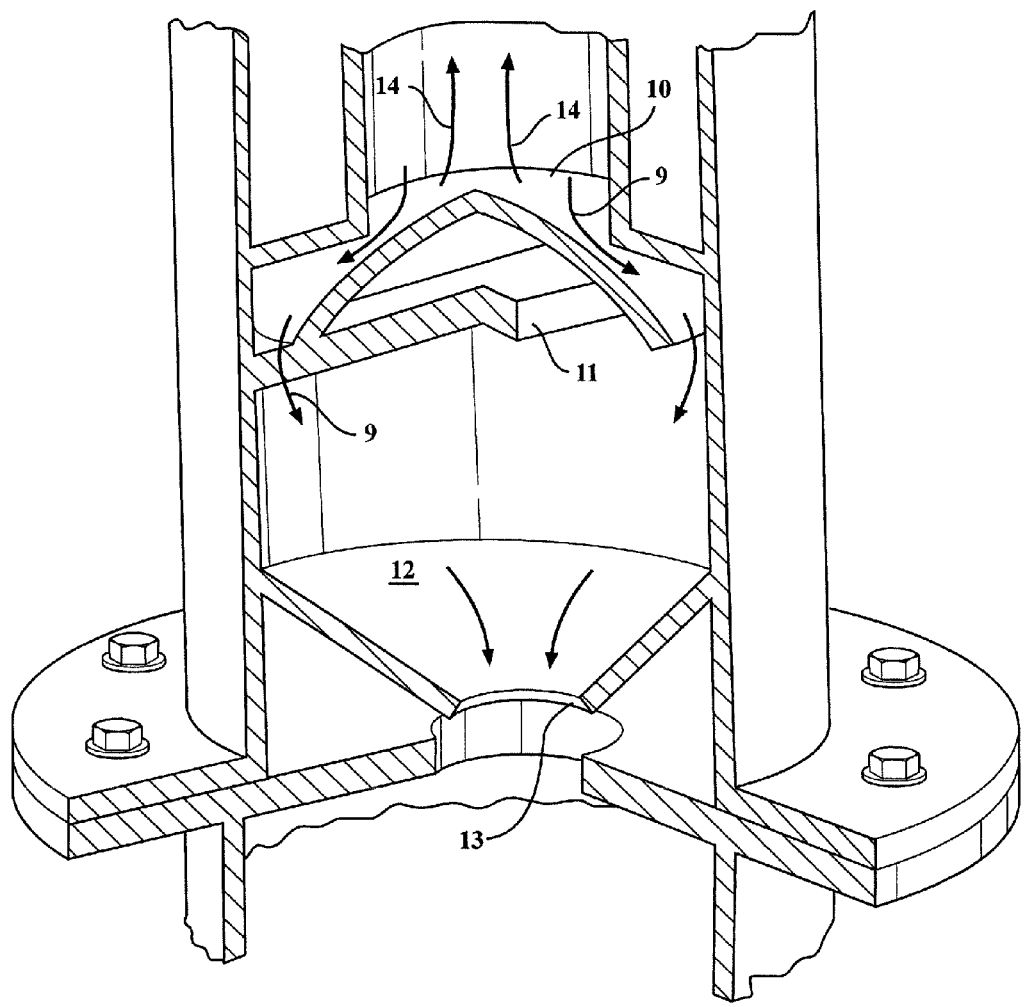
FIG. 6 is a further enlarged perspective of a collection component associated with a lower end of the upper centrifugal separator and for providing simultaneous vertical gravity feed of dirty particulate entrained water remaining from passage through the centrifugal separator, combined with a negative pressure (Venturi effect) up-flow of a volume of clean fluid through a vertically ascending pipe mounted within the open interior of the upper centrifugal separator.

Proceeding to the succeeding illustrations of FIGS. 4-6, additional detail is provided regarding the operation of the upper centrifugal separator 1 and which again illustrates the delivery of the inlet (dirty) flow via pipe 6 located in communication with a generally upper end location of the upper housing associated with centrifugal separator and such that the dirty fluid enters an inlet location 7 of an inner cavity of the housing. For purposes of ease and clarify of illustration, a spiraling centrifugal separator is partially illustrated in phantom 8 in FIG. 4 and further shown in schematic in FIG. 5 and can, by intended design, integrate a parallel or a reducing or narrowing of diameter or cross sectional profile along its descending height (this increasing velocity along the centrifugal separating stage and providing the eventual negative pressure for clean water up-flow as will be subsequently described). Although not shown, it is also understood that the spiral descending and narrowing centrifugal separator can exhibit either a closed or open slide profile in cross section and which, without limitation, hugs the inside cylindrical surface of the upper separator 1.

As shown, the centrifugal separator provides the combined aspects of influencing entrapped particulates and other media for removal from the downwardly spiraling flow and for redirection as a subdivided (and particle entrained) flow 9 (see FIGS. 5 and 6) for delivery to a pseudo/inverted saucer shaped component 10 (this exhibiting in one non-limiting example an inverted convex surface as best shown in FIG. 4) positioned at a bottom receiving end of the centrifugal subassembly interior. As best shown in FIG. 6, the collection component 10 is supported by an underside spaced brace 11 or the like and feeds the dirty/centrifugally separated flow of fluid 9 down over the convex surface of the collection component 10 for subsequent collection and gravity feed in an evenly distributed fashion through a bottom most located funnel 12, an outlet 13 of which corresponding to an inlet of the lower positioned and communicating baffle filter subassembly 2.

It is understood that the interiorly suspended/supported collection component 10 and (optionally) the funnel 12 can be combined into a removable sub-assembly which is capable of being quickly removed and cleaned or exchanged during normal operation, such as in order to allow cleaning of the convex sludge collection chamber. The removability aspect of the collection component 10 and funnel 12 can be facilitated by the reconfiguration depicted in FIG. 4A and by which the lower sludge collector components (collection component 10 and bottom located funnel 12) associated with the upper centrifugal separator are integrated into a separate and slide-out removable module which facilitates easy replacement with a clean module with minimal down time and further ease in subsequent cleaning of the fouled collector. This is depicted by an outer spaced apart pair of annular projecting plates, designated at 1A and 1B and associated with an anchored or otherwise vertically supported outer housing of the upper separator 1, between which an inner pair of plates 1C and 1D and a removable cylindrical portion 1E are releasably secured by upper 1F and lower 1G circumferentially arrayed bolt and nut fasteners.

Figure 4A:
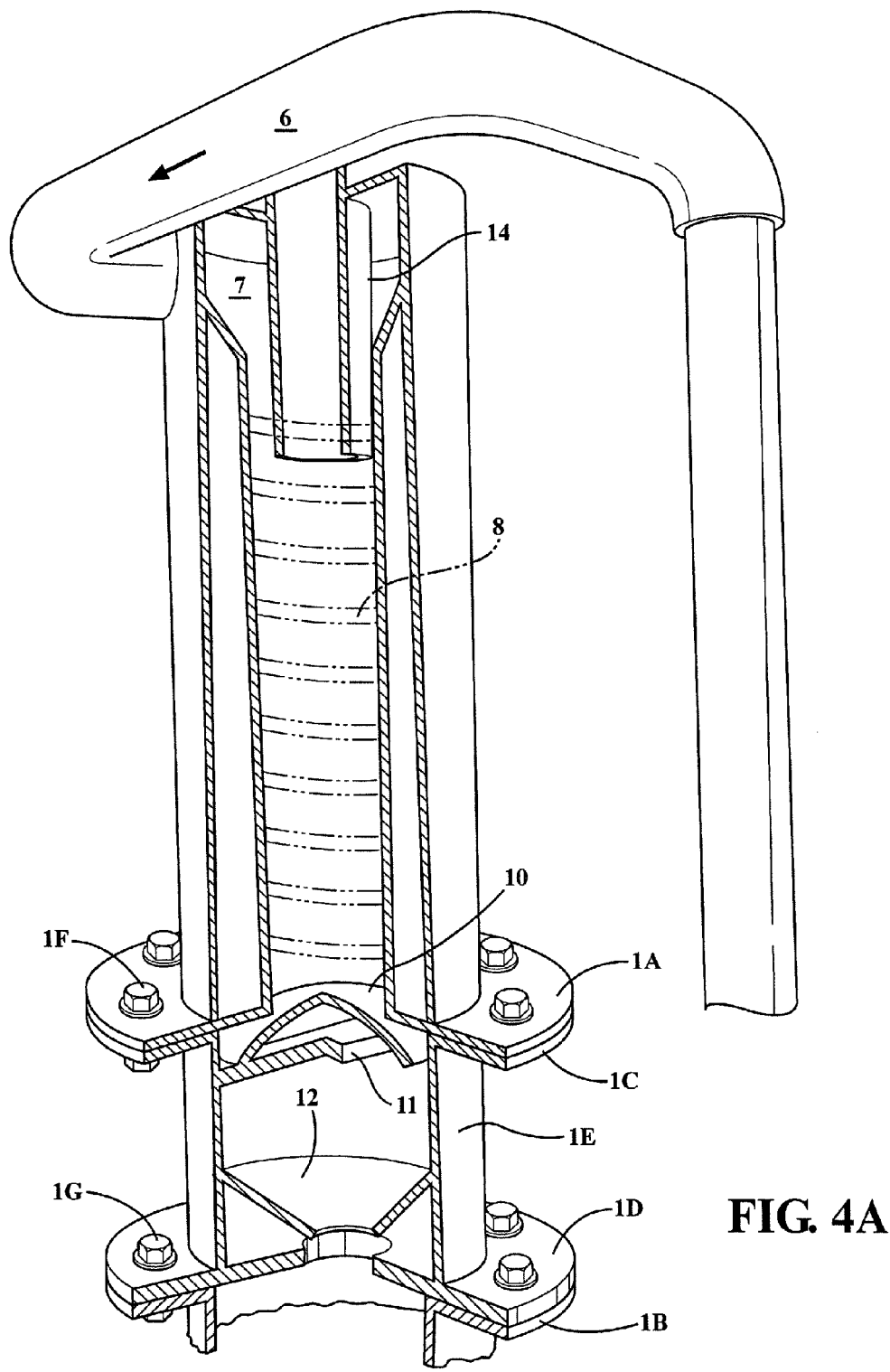
FIG. 4A is a slight modification of the cutaway assembly depicted in FIG. 4 and by which the lower sludge collector components associated with the upper centrifugal separator are integrated into a removable module which facilitates easy replacement with a clean module with minimal down time and further ease in subsequent cleaning of the fouled collector.

In the revised variant of FIG. 4A, the collection component 10 and funnel 12 are integrated into the removable section 1E of the upper separator 1 and, in use, the separator can be momentarily deactivated to allow for quick changeout of the fouled collection components with a clean replacement component. Following quick reattachment of the upper 1F and lower 1G fasteners, the separator can be reactivated and sludge separation quickly resumed.

Figure 4B:
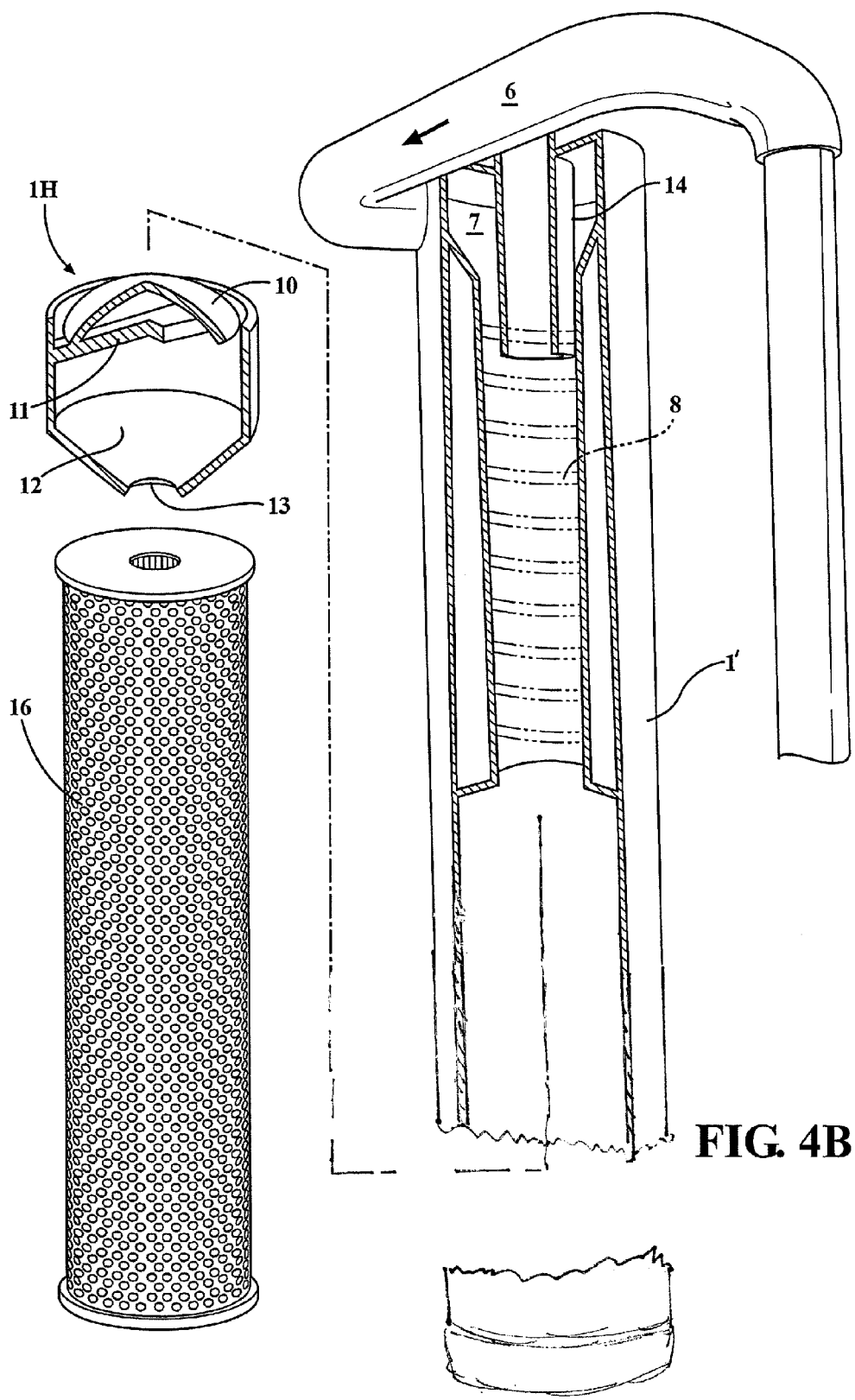
FIG. 4B depicts a further modification of the assembly of FIG. 4 depicting the lower sludge collector components incorporated into a sleeve shaped and cartridge type insertable component which inserts over the top of the baffle style filter and which serves both as a separation apparatus and a filter hold down mechanism.

Without limitation, it is understood that a removable section incorporating the collection component and funnel can be redesigned or reconfigured in any number of different fashions from that shown and with the intention to provide for quick change out of a fouled sub-assembly with an identically configured replacement. As further referenced in FIG. 4B, this can include integrating collection components 10, brace 11 and funnel 12 with bottom end discharge 13 into a sleeve shaped and cartridge type insertable component, see as generally depicted at 1H, which inserts over the top of the baffle style filter 16 and which serves both as a separation apparatus and a filter hold down mechanism. In this variant, the flange constructions in FIGS. 4 and 4A are removed and the overall cylindrical housing incorporating the upper stage separator and lower filtration stage can be constructed as a single continuous tube 1' permitting bottom loading of the combination component 1H and the sleeve 16. To this end, a separate bottom seal and cap is provided for closing off the assembly.

Additional envisioned variants can also include a suitable high pressure backwash protocol built into the upper separator 1 and which provides for quick and iterative cleanout removal of sludge build up resulting from normal use.

During normal operation of the centrifugal separator, a negative pressure zone or vacuum is created within the open interior of the upper separator 1 (this known also as a Venturi effect in which a fluid flow through a restricted area results in simultaneous increase in velocity and decrease in pressure), such that an up-flow of a volume of clean fluid through a vertically ascending pipe 14 (see FIGS. 5 and 6) mounted within the open interior of the upper centrifugal separator. The clean outlet flow can exhibit, without limitation, such as 0.98 specific gravity of the carrier fluid or higher and correspond to approximately 98% removal of the sludge, such as without limitation at 2.8 specific gravity or higher and about 60 micron, and/or the like and prior to be discharged through outlet clean line 15 (FIG. 1) for subsequent rerouting to either a sump or other remote location for further cleaning/reprocessing and such as prior to be reintroduced into a suitable feed coolant reservoir.

Figure 7:
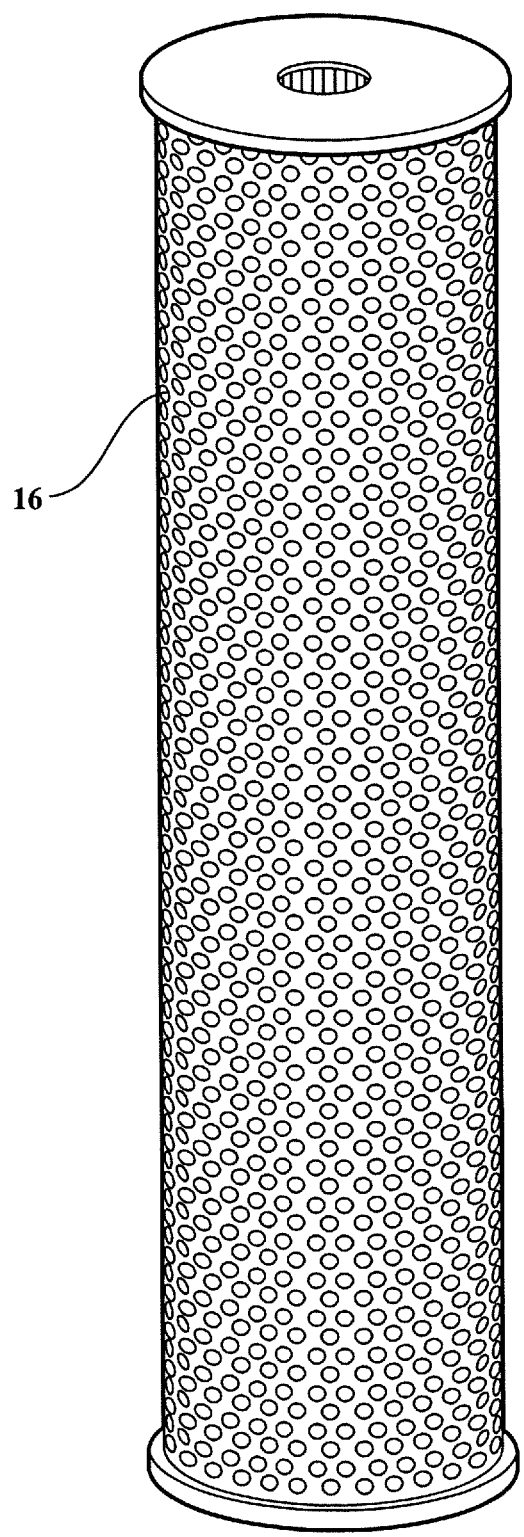
FIG. 7 is an illustration of a cylindrical filter element associated with the lower baffle filter subassembly.

FIG. 7 is an illustration of a cylindrical filter element 16 associated with the lower baffle filter subassembly 2 and which operates to entrap the particulates separate from the gravity fed and downwardly flowing stream 9 delivered by the centrifugal separator. As shown, the baffle filter 16 can exhibit an outer perforated screen which houses any type of capturing media, such as rated for entrapping in any range including but not limited to 0.35 to 30 micron or larger sized particulates, and which permits a centrally interior delivered dirty flow 9 from inlet 13 (again FIG. 6) to flow radially outwardly such that the particulates are entrapped within the filter media.

Figure 3:
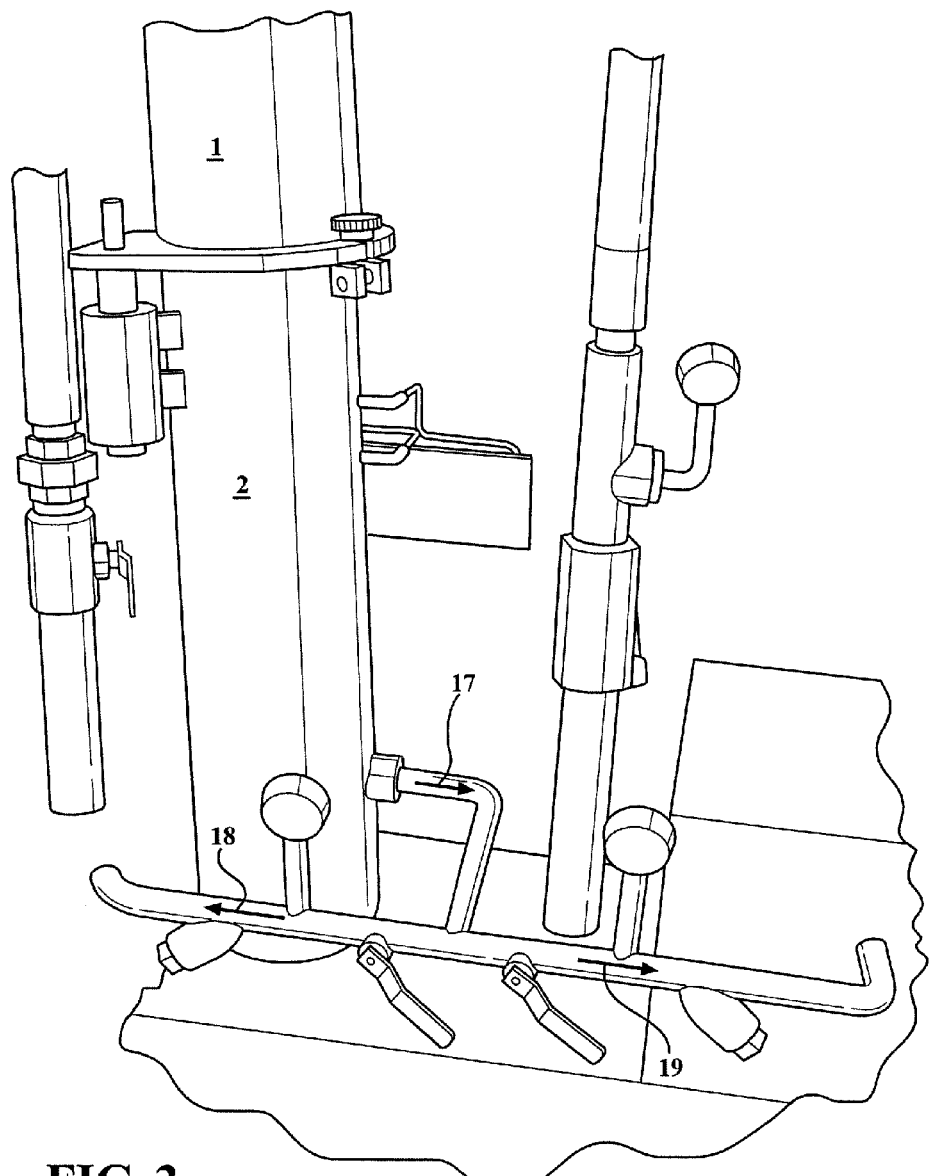
FIG. 3 is a reverse side view of the concentrator assembly shown in FIG. 1 and illustrating in larger sectional fashion a lower (clean) outlet associated with the barrier filter subassembly and which can be piped for dual applications.

The remaining clean fluid flows from the open interior of the filter 16, through the baffles and out the exterior and cylindrical configured/apertured screen, following which the now substantially clean flow descends along an annular extending exterior of the filter 16 and the surrounding inner wall of the lower subassembly 2 to an outlet depicted in FIG. 3 as conduit line 17 extending from lower filter subassembly 2 and subsequently branching to opposite extending outlets 18 and 19, each of which can further represent sump or resupply lines (such as further to facilitate ongoing fluid flow in a separate processing application). The flow properties associated with this port function are designed in part to maintain balance in the upper stage flow and, in one non-limiting instance, can be regulated down to approximately 10% of the upper input flow rate with the use of any suitable valving or flow regulating components integrated into the assembly.

FIG. 8 illustrates a schematic illustration of an alternate variant of a two stage sludge concentrator assembly and which integrates dual baffle filters represented by lower subassembly housings 20 and 21 (each of which receiving a filter 16), these arranged in selective communication with an upper stage centrifugal separator, such as previously described at 1). As further depicted in succeeding exploded perspective and cutaway views of FIGS. 8A and 8B, a confluence location is established underneath the outlet 13 of the bottom located funnel 12 associated with the centrifugal separator 1, this including a sleeve 22 which intercepts the outlet 13 and to which in turn are communicated with a pair of angled and flow receiving outlets 24 and 26 feeding respective inlet locations of each lower subassembly housing 20 and 21.

A cylindrical valve assembly includes such as an outer machined steel sleeve 28 exhibiting an open interior and within which is seated a rotatable and inter-actuating UHMW (ultra high molecular weight polyethylene) valve core 30 as well as any other material such as brass, stainless steel or the like. A first seating location 32 is configured in an circumferential facing direction to an inserted end location of the cylindrical shaped core 30 and which is opposed by an additional seating location 34 configured in communication with the interior of the sleeve 28 for abutting the first seating location 32 of the core at a defined rotational position.

The features represented at 32 and 34 are generally understood to correspond to a single or pair of respective opposing and abutment locations established between the core 30 and the outer sleeve 28 and, in use, restrain the core to a limited rotational range for facilitating flow redirection between either of the outlets 24 and 26. This is further assisted by a fluid communicating pathway defined by concave feature or recess, at 36, define in the rotatable core 30 and which, depending upon the rotational position of the core 30 relative to the outer sleeve 28, fluidly communicates the upper outlet 13 of the centrifugal separator 1 with either of the angled outlets 24 and 26 leading to the lower baffle assemblies 20 and 21.

Additional features include a valve gland 38 with compression nut 40 and gland packing 42. A stainless steel valve stem 44 is also depicted at extending through an end wall aperture of the outer sleeve 28 and, in combination with an exteriorly located handle 46, rotates the core 30 between a first position in which the feature 36 communicates dirty flow from upper outlet 13 to a first selected outlet 24 to a second position in which upper outlet 13 is communicated with second selected outlet 26.

In this manner, the valve assembly is employed for selectively delivering the waste fluid stream 9 from the upper separator subassembly 1 to a selected/engaged lower baffle filter subassembly 20 or 21, such permitting the inactive baffle filter subassembly to be rotated outwardly from a first fluidic communicating position to an open position for permitting servicing and/or removal/replacement of a used baffle filter. It is also envisioned that the valve configuration of FIGS. 8A and 8B can be redesigned or substituted with any suitably constructed valve subassembly, such as which incorporates a core exhibiting any other suitable flow permitting architecture, such as which can further substitute the concave recess 36 for any other interior extending network or pattern defined in the core 30, and which facilitates fluid flow from the upper outlet 13 and between one of the lower angled flow outlets 24 and 26 to the respective baffle filter subassemblies.

Referring finally to FIGS. 9A and 9B, respective top and partial side views are presented of the dual baffle filter variant of FIG. 8 and which better illustrates one non-limiting construction in which a selective drop and rotate configuration converts either baffle filter subassembly 20 or 21 from fluidly connected/engaged to fluidly disconnected/opened positions. As shown, this can include a support post or stem 48 (also termed common post) to which each of the baffle filter housings 20 and 21 are secured in a suitable coupling arrangement which is lever actuated via known structural connections for permitting either filter housing 21 or 22.

The present invention contemplates any of a number of different protocols for disassembling a given filter housing 21 and 22 and which can include, in one non-limiting version, either housing initially descending from an underside seating location associated with either angled outlet 24 and 26 a limited distance (see further directional arrows 50 and 52 in FIG. 9B) in order to become disconnected from a lowermost extending plate 53 within which is communicated the bottom most extending locations of the outlets 24 and 26 alternately in communication with the upper centrifugal separator 1.

Following initial vertical descent of the housing 21 or 22, it can be subsequently outwardly rotated about the common post 48 along either of additional directional arrows 54 or 56 (see as shown in phantom in FIG. 9A corresponding to open housing positions 20' and 21') thereby revealing the open interior and permitting fast cleaning or exchange of a clogged filter for a replacement).

Also shown at 58 and 60 in FIGS. 8 and 9B are the central post connector couplings 58 and 60 arranged in one non-limiting and stacked fashion around the central post 48 and in turn structurally supporting the individual lower baffle housings 20 and 21. In order to facilitate alternate removal of either housing 20 and 21, this again in order to access its interior and to allow removal and replacement of the baffle filter 16, it is understood that the dimensions of the supporting central post 48, as well as the spacing between the connector couplings 58 and 60, can be modified.

This can include, in one particular instance, in designing the upper coupling 58 associated with filter assembly 20 for removal and replacement to be spaced differently than is shown in order that it be permitted to initially descend a given distance without contacting the lower coupling 60 and then subsequently swung open. It is also envisioned that, upon opening a selected housing 20 or 21 by first unscrewing/removing sealing fasteners (see pairs at 58 and 60) which clamp to pairs of tabs (further shown at 62 and 64 at upper end locations of the housings 20 and 21), a selected housing 20 or 21 is unsealed from the configured plate 53. At this point, and without limitation, the mechanical articulation of the housing 20 or 21 can be permitted to either initially descend (arrows 50 and 52) or initially swing outwardly (arrows 54 and 56) to facilitate quick change out and replacement of a selected filter subassembly while retaining flow operation through the other filtration subassembly.

Other features include a suitable control panel 66 (FIG. 1) and which can include a suitable processor control for setting the various operational parameters of the inflow pump 4 and associated outflow conduit lines. Having described my invention, other and additional preferred embodiments will become apparent to those skilled in the art to which it pertains, and without deviating from the scope of the appended claims.

I claim:

1. A dual stage filter assembly for use in a fluid cleaning and sludge removal operation, comprising:
   a body defining an elongated fluid vessel with an upper chamber and a fluidly connected lower chamber;
   an upper stage centrifugal separator incorporated into said upper chamber;
   an inlet pipe communicated with said upper chamber for introducing a dirty fluid flow to said centrifugal separator;
   a lower stage baffle filter having a cylindrical shape with a central interior passageway incorporated into said lower chamber in fluidic communication with a lower end of said separator; and
   a fluid collection and redirection element interposed between said upper stage separator and said lower stage baffle filter, said fluid collection and redirection element further including a convex collection element and an underneath situated funnel;
   a clean fluid outlet communicating with an open interior of said upper stage separator and encouraged by a negative pressure zone created within said upper chamber resulting from increase in velocity of said fluid communicated through a descending spiral profile;
   said fluid collection and redirection element communicating with a separate dirty fluid outlet from said upper separator which flows over an outer periphery of said convex element and, subsequently, is collected within said funnel for passage through a bottom orifice associated with said funnel, said fluid passing vertically through said central interior passageway of said cylindrical filter, and outflowing through a wall of said filter and through at least one further outlet extending from said lower stage filter.

2. The filter assembly as described in claim 1, said clean fluid outlet further comprising an ascending pipe extending from said upper separator and evacuating a clean fluid flow resulting from the negative pressure created within said upper separator.

3. The filter assembly as described in claim 1, further comprising a pair of lower baffle filter subassemblies selectively communicated to said upper separator via a directional valve.

4. The filter assembly as described in claim 3, further comprising a common mounting post for supporting said pair of lower baffle filter subassemblies in selective fluidic disengaging and rotatable opening fashion.

5. The filter assembly as described in claim 4, further comprising a valve for alternately directing fluid flow to either of said lower baffle filter subassemblies and in order to permit a non-utilized filter subassemblies to be unseated and opened for filter replacement.

6. The filter assembly as described in claim 5, said valve further comprising at least one inner and circumferentially opposing feature designed into a core seated within an outer sleeve and which, upon being actuated by an external handle, allowing a limited rotation of said core in order to communicate a recessed surface in the core between an upper outlet associated with said upper stage centrifugal separator with either of a pair of lower angled outlets extending to said lower baffle filter subassemblies.

7. The filter assembly as described in claim 1, said collection element and funnel being incorporated into a slide out removable section associated with said upper stage separator.

8. The filter assembly as described in claim 7, further comprising an outer spaced apart pair of annular projecting plates associated with a vertically supported portion of said upper stage separator, an inner spaced apart pair of plates incorporating a removable cylindrical portion containing said collection element and funnel and being releasably secured between said outer plates by upper and lower circumferentially arrayed bolt and nut fasteners.

9. A dual stage filter assembly for use in a fluid cleaning and sludge removal operation, comprising:
   a body defining an elongated fluid vessel with an upper chamber and a fluidly connected lower chamber;
   an upper stage centrifugal separator incorporated into said upper chamber;
   an inlet pipe communicated with said upper chamber for introducing a dirty fluid flow to said centrifugal separator;
   a pair of lower stage baffle filter subassemblies, each having a cylindrical shaped filter with a central interior passageway, said filters incorporated into said lower chamber and selectively communicated to said upper separator via a fluid collection and redirection element interposed therebetween which is in turn in communication with a directional valve for directing fluid from said upper stage separator to a selected one of said lower stage baffle filter subassemblies;

said upper stage separator having a clean fluid outlet communicating with an open interior and encouraged by a negative pressure zone created within said upper chamber resulting from increase in velocity of said fluid communicated through a descending spiral profile;

said fluid collection and redirection element further including a convex collection element and an underneath situated funnel, said fluid collection and redirection element communicating a separate dirty fluid outlet from said upper separator which flows over an outer periphery of said convex element and, subsequently, is collected within said funnel for passage through a bottom orifice associated with said funnel, said fluid passing vertically through said central interior passageway of a selected one of said cylindrical filters, and outflowing through a wall of said filter through at least one further outlet extending from said lower chamber.

10. The filter assembly as described in claim 9, said clean fluid outlet further comprising an ascending pipe extending from said upper separator and evacuating a clean fluid flow resulting from the negative pressure created within said upper separator.

11. The filter assembly as described in claim 9, further comprising a common mounting post for supporting said pair of lower baffle filter subassemblies in selective fluidic disengaging and rotatable opening fashion.

12. The filter assembly as described in claim 11, further comprising a valve for alternately directing fluid flow to either of said lower baffle filter subassemblies and in order to permit a non-utilized filter subassemblies to be unseated and opened for filter replacement.

13. The filter assembly as described in claim 12, said valve further comprising at least one inner and circumferentially opposing feature designed into a core seated within an outer sleeve and which, upon being actuated by an external handle, allowing a limited rotation of said core in order to communicate a recessed surface in the core between an upper outlet associated with said upper stage centrifugal separator with either of a pair of lower angled outlets extending to said lower baffle filter subassemblies.

14. The filter assembly as described in claim 9, said collection element and funnel being incorporated into a slide out removable section associated with said upper stage separator.

15. The filter assembly as described in claim 14, further comprising an outer spaced apart pair of annular projecting plates associated with a vertically supported portion of said upper stage separator, an inner spaced apart pair of plates incorporating a removable cylindrical portion containing said collection element and funnel and being releasably secured between said outer plates by upper and lower circumferentially arrayed bolt and nut fasteners.

16. A dual stage filter assembly for use in a fluid cleaning and sludge removal operation, comprising:

a body defining an elongated fluid vessel with an upper chamber and a fluidly connected lower chamber;

an upper stage centrifugal separator incorporated into said upper chamber;

said centrifugal separator incorporating a descending spiral profile, an inlet pipe communicated with said upper chamber for introducing a dirty fluid flow to said centrifugal separator;

a fluid collection and redirection element including a removable subassembly located between said upper and lower chambers, said removable subassembly having a convex collection element and an underneath situated funnel, said dirty fluid descending from said upper stage separator flowing over an outer periphery of said convex element and collecting within said funnel for passage through a bottom located orifice associated with said funnel; and a lower stage baffle filter having a cylindrical shape with a central interior passageway, said filter communicable with said upper stage separator via said bottom orifice, said lower stage filter being incorporated into said lower chamber in fluidic communication with said upper stage separator via said collection and redirection element for funneling water vertically through said central interior passageway and outflowing through a wall of said filter, said upper stage separator having an ascending pipe extending from said upper separator and evacuating a clean fluid flow resulting from a negative pressure created within said upper separator and resulting from increase in velocity of said fluid communicated through said descending spiral profile, the dirty fluid flow from said upper separator outflowing through at least one further outlet extending from said lower stage filter.

17. The filter assembly as described in claim 16, said collection element and funnel being incorporated into a slide out removable section associated with said upper stage separator.

18. The filter assembly as described in claim 17, further comprising an outer spaced apart pair of annular projecting plates associated with a vertically supported portion of said upper stage separator, an inner spaced apart pair of plates incorporating a removable cylindrical portion containing said collection element and funnel and being releasably secured between said outer plates by upper and lower circumferentially arrayed bolt and nut fasteners.

\* \* \* \* \*